Nov. 28, 1967      R. F. ANDERSON      3,354,499
COUNTERBALANCING HINGE SUPPORT
Filed Oct. 7, 1965                         2 Sheets-Sheet 1
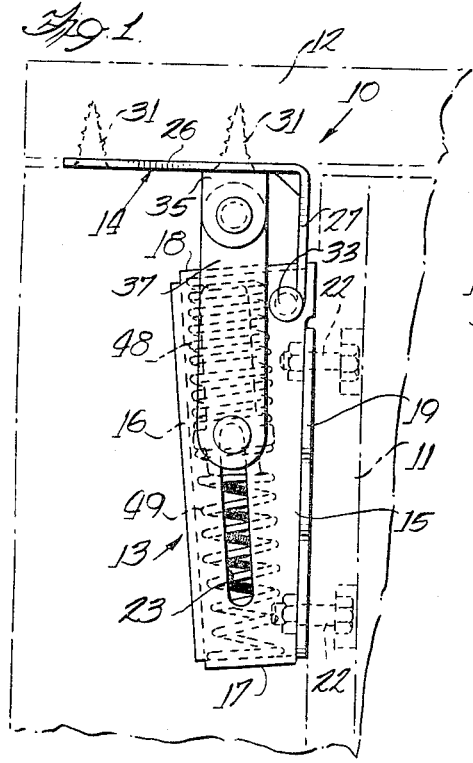
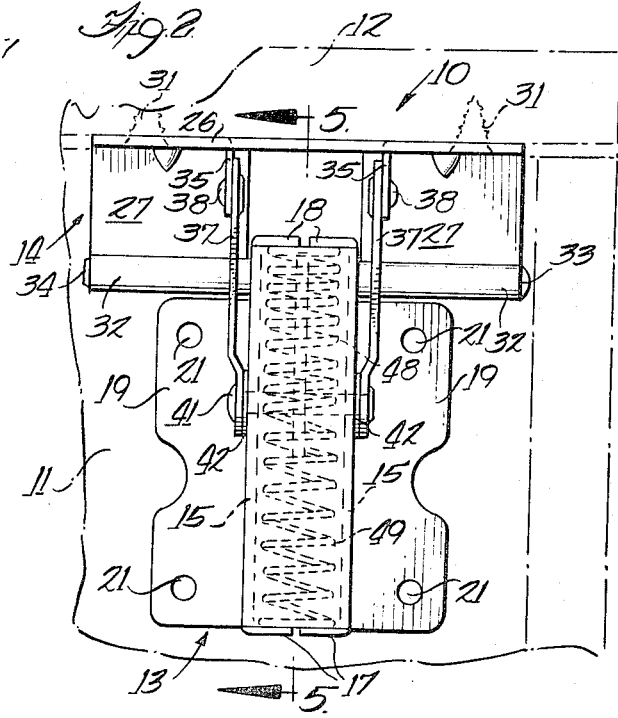
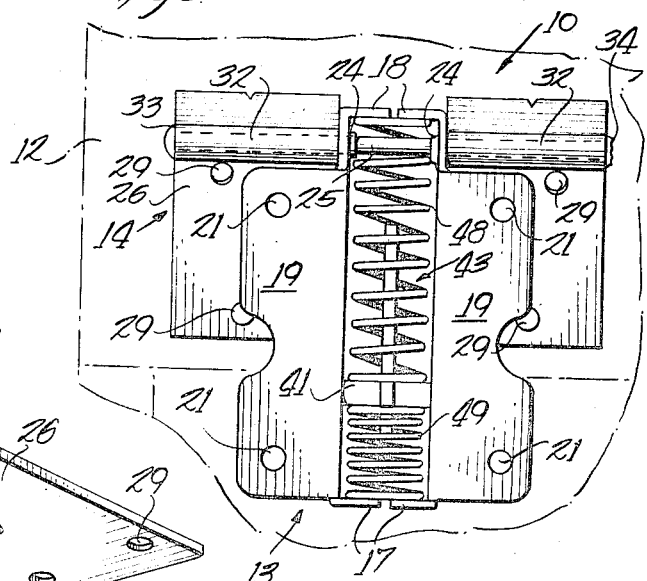
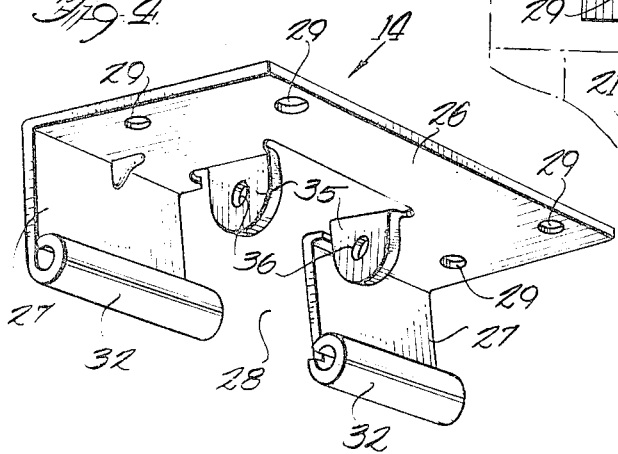
Inventor
Ralph F. Anderson
Wilson & Geppert
Attorneys

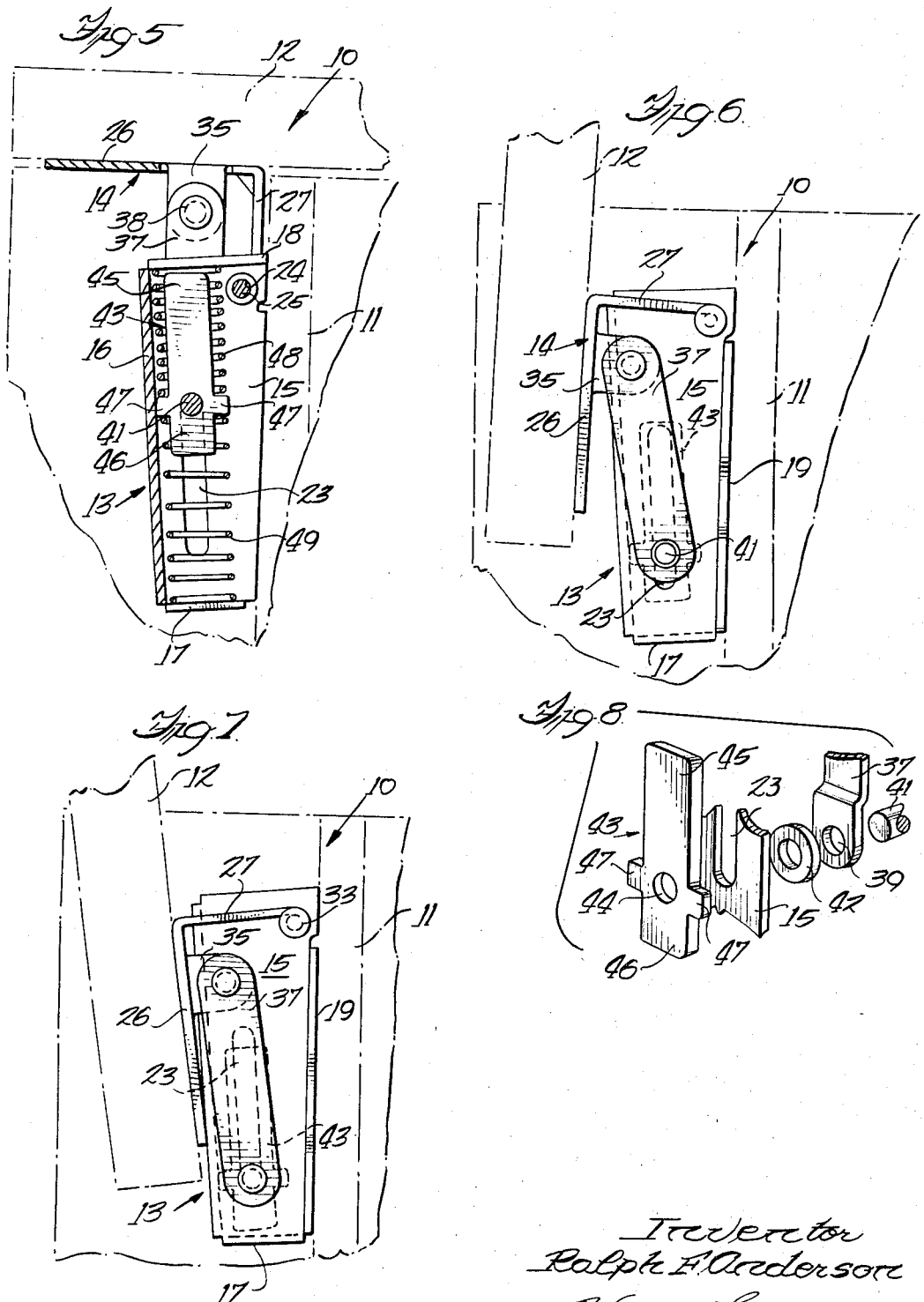

United States Patent Office 3,354,499
Patented Nov. 28, 1967

3,354,499
COUNTERBALANCING HINGE SUPPORT
Ralph F. Anderson, Rockford, Ill., assignor to National Lock Co., Rockford, Ill., a corporation of Delaware
Filed Oct. 7, 1965, Ser. No. 493,716
10 Claims. (Cl. 16—180)

The present invention relates to a counterbalancing hinge support for the lid of a cabinet and more particularly to a counterbalancing hinge which will allow a cabinet lid to be opened beyond 90° with no adverse shock to the lid or cabinet.

Among the objects of the present invention is the provision of a counterbalancing hinge support which is secured to a cabinet and its lid which employs a drop spring and a shock spring actuated by movement of the lid support pivotally mounted on the housing for the hinge. The lid support is secured to the rear overhang portion of the lid on the cabinet therefor. The drop spring acts as the counterbalancing force for the weight of the cabinet lid and the shock spring acts to allow the lid to be opened beyond 90° without adverse shock to the lid or cabinet; the shock spring acting as a cushion for movement of the lid and hinge bracket support beyond the normal open position for the lid.

Another object of the present invention is the provision of a counterbalancing hinge support having a housing secured to the rear surface of a cabinet and a lid support pivotally mounted at the upper end of the housing and having a flange which is secured to the underside of a horizontal surface of the cabinet lid extending rearwardly beyond the rear wall of the cabinet. A pair of support arms are pivotally mounted on the lid support at one end, and at their opposite ends the arms are secured to a pin extending through the housing between the drop and shock springs. A generally T-shaped spring retainer is mounted on the rod and extends oppositely into the two springs. Plastic washers are mounted on the pin or rivet between the housing and the lower end of each support arm.

A further object of the present invention is the provision of a counterbalancing hinge support having a housing and lid support pivotally joined through an elongated rod. The lid support includes flanges positioned on either side of the housing with the edges of the separated flanges curled around the elongated pin or rod to maintain desired friction between the support arms, plastic washers, and the support housing.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a side elevational view of the hinge support assembly secured to the rear wall of a cabinet and the underside of the lid with the lid in its closed position.

FIG. 2 is a rear elevational view of the hinge support assembly shown in the same position as FIG. 1.

FIG. 3 is a front elevational view of the hinge support assembly with the assembly shown in its normal open position.

FIG. 4 is a perspective view of the lid support for the hinge support assembly.

FIG. 5 is a vertical cross sectional view of the hinge support assembly taken on the line 5—5 of FIG. 2.

FIG. 6 is a side elevational view of the hinge support assembly with the lid in normal open position.

FIG. 7 is a side elevational view similar to FIG. 6, but with the lid in an extended open position.

FIG. 8 is an enlarged partial exploded view of the spring retainer, rivet and support arm assembly.

Referring more particularly to the disclosure in the drawings wherein is shown an illustrative embodiment of the present invention, the hinge support assembly 10 is shown mounted on the rear exterior surface of a cabinet 11 for a stereo, etc., with a lid 12 on the upper open end of the cabinet and extending beyond the rear wall thereof. The assembly 10 includes a housing 13 and a lid support 14; the housing 13 includes a generally U-shaped member having side walls 15, 15 and a rear wall 16. A pair of base flanges 17, 17 are formed on the lower ends of the walls 15, 15 and are folded inward to close the lower end of the housing, and a like pair of flanges 18, 18 close the upper end of the housing.

A pair of laterally projecting mounting flanges 19, 19 are integral with and extend outwardly of the side walls with openings 21 for suitable mounting means, such as the anchoring bolts and nuts 22 or other fastening means, to mount the housing 13 on the rear surface of the cabinet 11. Each side wall is provided with an elongated slot 23, and the rear wall 16 is positioned at a slight upward incline away from the plane of the mounting flanges 19, 19; the slots 23, 23 being substantially parallel to the rear wall 16. Also the side walls 15, 15 are provided with aligned extruded openings 24, 24 adjacent the upper end of the housing and the mounting flanges to receive an elongated hinge pin 25.

The lid support 14 includes a mounting flange 26 and spaced depending hinge flanges 27, 27 separated by a space 28 of a width slightly greater than the width of the housing 13; the space 28 extending into the flange 26 for approximately one-half the width thereof (see FIG. 4). The flange 26 includes openings 29 adapted to receive suitable securing means, such as screws 31, to attach the flange to the underside of the lid 12 extending rearwardly beyond the rear wall of the cabinet 11. The spaced flanges 27, 27 each terminates at the lower end in a curled portion 32 which is adapted to encompass the elongated hinge pin 25. The hinge pin 25 has an enlarged head 33 at one end and extends through a pin curled portion 32, opening 24, housing 13, opposite opening 24, opposite curled portion 32 and terminates in a headed or upset end 34.

A pair of depending ears 35, 35 are formed in the flange 26 and depend downward at each side of opening 28; each ear 35 having a central opening 36. A support arm 37 is pivotally mounted at one end on each ear by a rivet 38, and the opposite end of the arm 37 has an opening 39 (see FIG. 8) to receive a long rivet or pin 41 which extends through the housing 13 and the elongated slots 23, 23 in the sides 15, 15 thereof. A friction washer 42 made of a suitable material, such as nylon, is positioned on the rivet 41 between the support arm 37 and the side 15 of the housing.

Within the housing 13 is positioned a spring retainer 43 (see FIG. 8) having an opening 44 receiving the rivet 41; the retainer having a general cruciform configuration with a relatively long leg 45, an oppositely extending relatively short leg 46 and a pair of oppositely disposed arms 47, 47 horizontally aligned with the opening 44. A relatively heavy drop spring 48 is located within the housing 13 above the rivet 41 with one end of the spring 48 encompassing the relatively long leg 45 and the opposite end extending upward behind the elongated pin 25, as seen in FIG. 3, and abutting an embossment formed on the flanges 18, 18 closing the upper end of the housing. A relatively light drop spring 49 is located in the housing 13 below the rivet 41 with one end of spring 49 encompassing the relatively short leg 46 of the retainer and the opposite end of the spring abutting an embossment formed on the flanges 17, 17. The inner ends of the springs abut the edges of the oppositely disposed arms 47, 47 on the retainer 43.

In operation, the relatively heavy spring 48 counterbalances the weight of the lid 12 for the cabinet. As seen in FIGS. 1 and 2, the spring 48 is in a compressed position when the lid is closed, the force of the spring 48 resisting compression counterbalancing the weight of the lid with the forces substantially equal to retain the lid 12 in closed position. As the lid is manually opened, the lid support 14 pivots relative to the housing 13 around the hinge pin 25 and the ears 35 are moved in a downwardly arcuate path. This movement causes downward movement of the rivet 41 and the spring retainer 43 through the support arms 37, 37 connected to the ears 35, 35. As the spring retainer 43 moves downward, the heavy upper spring 48 is extended to its normal position where the lid is open as shown in FIGS. 3 and 6.

If the lid is opened suddenly and/or is moved beyond the 90° position relative to the cabinet as shown in FIG. 6 to the position shown in FIG. 7, the rivet 41 and spring retainer 43 act to compress the relatively light spring 49 to prevent any adverse shock to the lid or cabinet. Both the light spring 49 and the heavy spring 48 will tend to urge the spring retainer 43 and lid to the normal position shown in FIGS. 3 and 6 where the lid has been moved to a position beyond 90°. When the lid is closed, the spring 48 is again compressed to counterbalance the lid, and the spring 49 is extended with the upper end thereof moving with the retainer 43. In the normal open position shown in FIG. 3, both springs 48 and 49 are under some compression but their forces balance at this point.

Having thus disclosed the invention, I claim:

1. A counterbalancing hinge support for the lid of a cabinet comprising a housing secured to a rear wall of a cabinet and a lid support pivotally mounted on the housing and secured to the lid of the cabinet, said housing having spaced side walls, a rear wall and upper and lower ends providing upper and lower abutments, said side walls having aligned elongated slots therein, a pair of support arms each pivotally mounted at one end to the lid support, a rivet extending through said housing and having ends extending through said aligned slots, the opposite ends of said arms being connected to the ends of said rivet, first resilient means in said housing between said rivet and said upper abutment, and second resilient means located in the housing between said rivet and the lower abutment.

2. A counterbalancing hinge support as set forth in claim 1, in which said first resilient means is a relatively heavy spring and said second resilient means is a relatively light spring.

3. A counterbalancing hinge support as set forth in claim 2, including a spring retainer of generally cruciform shape mounted on said rivet and having a relatively long leg extending into the relatively heavy spring and a relatively short leg extending into the relatively light spring.

4. A counterbalancing hinge support as set forth in claim 1, in which said rear wall is slightly inclined upwardly and outwardly relative to the cabinet, and the elongated slots are parallel to said rear wall.

5. A counterbalancing hinge support for the lid of a cabinet, comprising a housing having spaced side walls with aligned elongated slots, a rear wall and upper and lower ends providing abutments, laterally extending mounting flanges integral with said side walls for securing the housing to the rear wall of the cabinet, a lid support having a mounting flange secured to the lid of the cabinet and spaced depending flanges pivotally mounted on said housing, spaced ears on the mounting flange of the lid support, a pair of support arms, each arm pivotally mounted at one end onto one of said ears and extending downwardly along the housing, a rivet extending through said housing and the aligned slots and connected to the opposite end of each arm, a spring retainer mounted on the rivet centrally within the housing, a relatively heavy spring mounted in the housing between the rivet and the upper abutment and cooperating with said spring retainer, and a relatively light spring positioned within the housing between the rivet and the lower abutment and cooperating with the spring retainer.

6. A counterbalancing hinge support as set forth in claim 5, in which said spring retainer is of a generally cruciform shape having a long leg extending axially into the relatively heavy spring, and a short leg extending axially into the relatively light spring.

7. A counterbalancing hinge support as set forth in claim 5, in which said relatively heavy spring counterbalances the weight of the lid and the relatively light spring prevents shock to the lid or cabinet if the lid is moved past its 90° position.

8. A counterbalancing hinge support as set forth in claim 5, in which the rear wall of the housing is slightly inclined upwardly and outwardly relative to said mounting flanges, and said elongated slots are generally parallel to the rear wall.

9. A counterbalancing hinge support as set forth in claim 5, in which said pivotal mounting between said housing and lid support includes an elongated hinge pin, said depending spaced flanges on said lid support terminating in curled portions encompassing said hinge pin, and said spaced sides of the housing having aligned openings adjacent the upper end and the mounting flanges receiving the hinge pin between the spaced flanges.

10. A counterbalancing hinge support as set forth in claim 5, including a friction washer mounted on the rivet between each side wall and the adjacent support arm.

References Cited

UNITED STATES PATENTS

| | | | |
|---|---|---|---|
| 1,887,579 | 11/1932 | Carozzi | 267—60 |
| 3,187,374 | 6/1965 | Lundell | 16—190 |
| 3,256,554 | 6/1966 | Turner | 16—190 |
| 3,316,581 | 5/1967 | Hornsby | 267—60 |

BOBBY R. GAY, *Primary Examiner.*

D. L. TROUTMAN, *Assistant Examiner.*